United States Patent [19]

Walz

[11] Patent Number: 4,709,521
[45] Date of Patent: Dec. 1, 1987

[54] METHOD OF INSERTING A TUBULAR OR BAR-SHAPED STRUCTURAL MEMBER TIGHTLY INTO A LOCATION HOLE IN A CONSTRUCTION ELEMENT

[76] Inventor: Georg Walz, Nibelungenstrasse 16, 7920 Heidenheim/Brenz, Fed. Rep. of Germany

[21] Appl. No.: 857,758
[22] PCT Filed: Oct. 10, 1985
[86] PCT No.: PCT/EP85/00530
§ 371 Date: Mar. 20, 1986
§ 102(e) Date: Mar. 20, 1986

[30] Foreign Application Priority Data

Oct. 24, 1984 [DE] Fed. Rep. of Germany .... 59-112786

[51] Int. Cl.⁴ .............................................. E04B 5/48
[52] U.S. Cl. ........................................ 52/220; 52/705; 405/303; 411/82; 411/258
[58] Field of Search ............... 52/705, 220, 221; 138/129; 411/82, 258; 405/259, 303

[56] References Cited

U.S. PATENT DOCUMENTS 1,157,986 10/1915 Jager ...................................... 52/705
2,733,939 2/1956 Scherer .

FOREIGN PATENT DOCUMENTS 839257 5/1952 Fed. Rep. of Germany .
2901266 7/1980 Fed. Rep. of Germany .
2979467 9/1983 Fed. Rep. of Germany .
8318034 11/1983 Fed. Rep. of Germany .
2370221 6/1978 France .
119329 1/1970 Norway .............................. 52/705
976201 11/1982 U.S.S.R. .

Primary Examiner—Henry E. Raduazo
Attorney, Agent, or Firm—Parkhurst & Oliff

[57] ABSTRACT

The invention relates to a method of inserting a tubular or bar-shaped structural member (3) tightly into a location hole (2) in a construction element (1) and to a lead-in tube (3) to be inserted into the opening (2) of a lead-in wall bushing. A helical spring (4), preferably designed as a tension spring, is positioned on the outer circumference of the lead-in tube (3) or other structrual member and receives in it stretched state—in the air gaps between its turns—a filling compound (6) which, after insertion of the thusly prepared tube (3) or structural member, is grouted in the annular gap between the tube (3) or structural member and the opening (2) of the lead-in wall bushing by forcing together the turns of the helical spring (4), filling this annular gap tightly and without spaces.

6 Claims, 3 Drawing Figures

METHOD OF INSERTING A TUBULAR OR BAR-SHAPED STRUCTURAL MEMBER TIGHTLY INTO A LOCATION HOLE IN A CONSTRUCTION ELEMENT

BACKGROUND AND SUMMARY OF THE INVENTION

The invention relates to a method of inserting a tubular or bar-shaped structural member tightly into a location hole in a construction element as set forth in the introductory clause of claim 1.

The main field of application of the invention is the tight insertion of lead-in wall bushings for cables, pipelines and the like in buildings, more particularly for the house lead-in bushings of feeding lines (main electric cable, gas and water supply lines and long-distance ducts) in buildings.

Generally speaking, house lead-in bushings for feeding lines of buildings are constructed with casing tubes or protective tubes which are fitted in an appropriately made masonry opening in the cellar wall and through which the particular feeding line is then passed.

As is well known, the insertion of these protective or casing tubes is caused by making the masonry opening somewhat larger, so that between the wall with the masonry opening and the house lead-in bushing an air gap remains which is filled up with mortar. This mortar serves both for the mechanically fixed anchorage of the lead-in tube in the masonry and for the sealing of the tube thereagainst.

As is generally known, the problem here is to inject the mortar or the filling compound in such a way into the annular gap between the lead-in tube and the wall with the masonry opening that it completely fills this annular gap without leaving any voids and is in proper sealing engagement with both the outer tube wall and the generally rough and usually irregular wall with the masonry opening.

In practice, however, this can hardly be achieved, because the lean mortar has the tendency of coagulating in the lower area of the annular gap and, moreover, when it comes into contact with the absorptive masonry, it very rapidly granulates so that it is extremely difficult to place the lean mortar very deeply in the opening of the lead-in wall bushing. Also, the injection of a spray of cement grouts is hardly possible, as cement mortar reacts immediately with segregation effects upon application of mechanical pressure for the spraying, because the water is squeezed out and the mortar granulates. However, even with filling compounds that do not exhibit these phenomena, the complete filling of the annular gap without voids is a problem that can only be solved with great difficulty.

Attempts have been made in the past, especially when inserting house lead-in bushings for feeding lines in outer cellar walls, to get the above problems under control. Thus, for example, West German Patent Specification No. 29 01 266 teaches one to provide the casing tube at one end with a fixed radial flange and, at its other end, with a radial flange sliding axially thereon and supported against the particular wall surface, as well as with a clamping device mounted in the area of said sliding radial flange and consisting of a male thread of the casing tube and a coupling nut screwed thereon and supported against the sliding annular flange. Prior to inserting the casing tube into the opening of the lead-in wall bushing between the two radial flanges, the filling compound is placed on the outer surface of the casing tube and, after insertion of the casing tube, the coupling nut is tightened, so that the casing tube is pulled axially a given distance through the sliding radial flange supported against the outer wall surface, thereby causing the fixed radial flange and the sliding radial flange to be brought closer to each other in order to grout the filling compound placed therebetween tightly between the wall with the masonry opening wall and the casing tube. To this end, the two annular flanges are also provided with seals.

Undoubtedly, by adopting this prior art teaching, the filling compound can be injected tightly—without voids—and sealingly between the casing tube and the wall with the masonry opening, but the constructional effort for the casing tube, with its flanges, seals and clamping device, appears unjustifiably high.

West German Utility Model No. 83 18 034 teaches one to provide the casing tube with a rib or the like designated as a resistance body which extends in the form of a helical spring over the outer surface of the casing tube with the object of creating resistances of flow—in the form of narrowed portions between the casing-tube circumference and the masonry opening—to the filling compound to be injected, so that the latter is not only prevented from coagulating in the lower area of the annular gap between the casing tube and the wall with the masonry opening, but is also forced by the resulting flow resistances to fill up the entire void. However, at least in the case of cement-based filling compound, this prior art proposal is believed to be hardly feasible because of the tendency of the cement mortar to become segregated upon application of pressure, and also because it starts to harden rapidly upon coming into contact with absorptive masonry. Aside therefrom, however, this prior art proposal, too, requires a relatively expensive design of the casing tube.

Therefore, the invention has as its object the creation of a method of the kind mentioned in the introduction, which permits the insertion of lead-in wall bushings or any other tubular or bar-shaped structural member into an appropriate location hole, such that with only little constructional effort and with a rapid and simple facility for placement, the annular gap between the wall with the location opening and the lead-in bushing or other structural member can be filled up completely without leaving any voids.

According to the invention, this object is achieved by the steps defined in the characterizing clause of claim 1.

Advantageous embodiments of the method incorporating the invention, which speak for themselves, are the subject matters set forth in claims 2 to 5.

In the method according to the invention, one can use a standard lead-in bushing or other structural member with a smooth outer surface on which the auxiliary element in the form of a helical spring can be pushed up. Prior to insertion of the lead-in bushing or other structural member into the location hole—while the auxiliary element is being held on the structural member with its turns stretched at corresponding axial distances—the filling compound, e.g. lean mortar, is placed on the outer surface of the structural member in the air gaps between the turns and, after insertion of the thusly prepared structural member into the location hole, the filling compound is grouted tightly into the annular gap between the lead-in tube or other structural member and the wall with the location hole by forcing the turns of the auxiliary element together in axial direction. With this construction, the auxiliary element, made appropriately of round stock, also acts in wedge-like fashion on the filling compound, so that the latter is pressed both against the outer wall of the lead-in tube or other structural member and the wall with the masonry opening.

When using an auxiliary element designed as a garter spring as defined in claim 2, whereby the spring is stretched in order to be able to inject the filling compound into the air gaps between the pulled-apart turns, the injection of the filling compound into the annular gap by the contracting turns when the spring is released occurs automatically.

In every case, the grouting of the filling compound during the pressing together or contraction of the turns of the auxiliary element can be furthered by mechanical vibrations, for example, by tapping on the lead-in tube or other structural member, or by rotating the auxiliary element.

The auxiliary element, preferably in the form of a helical spring, which can be fabricated simply and inexpensively, and the facility thus created for the simple and rapid placing of the filling compound and for its effective grouting, permits the mechanically fixed and tight insertion of lead-in tubes or other structural members with only a minimum expenditure of material and time. The auxiliary element constitutes not only an aid for the placing and grouting of the filling compound, it also augments the strength of the filling compound.

As stated earlier, the filling compound can be a lean mortar, but, depending on the application, it may also be any other plastic compound which hardens after it is injected.

The fixing of the auxiliary element in the form of a garter spring can be accomplished simply by locking the external turns by means of pins inserted temporarily into the wall of the lead-in tube or other structural member. These pins are subsequently removed in order to release the spring.

Needless to say that the field of application of the invention, as stated above, is not limited to the insertion of protective or casing tubes as house lead-in tubes for supply lines or the like as defined in claim 6. In principle, they also can also be used for inserting tubular or bar-shaped structural members into appropriate location holes in structural walls, floors, slabs or other construction elements. The location holes can be through holes as well as blind holes, and the forcing together of the turns of the auxiliary element in the former case occurs from both sides of the opening and, in the latter case, only from one of its openings.

A lead-in tube to be inserted into the opening of a lead-in wall bushing according to the method of the invention, more particularly as a house lead-in tube for house wiring cables, is the subject matter defined in claims 7 to 10.

DESCRIPTION OF THE DRAWING

An embodiment of the invention will now be described below with reference to the accompanying drawings, in which.

DETAILED DESCRIPTION OF PREFERRED EMBODIMENTS

Figure 1:
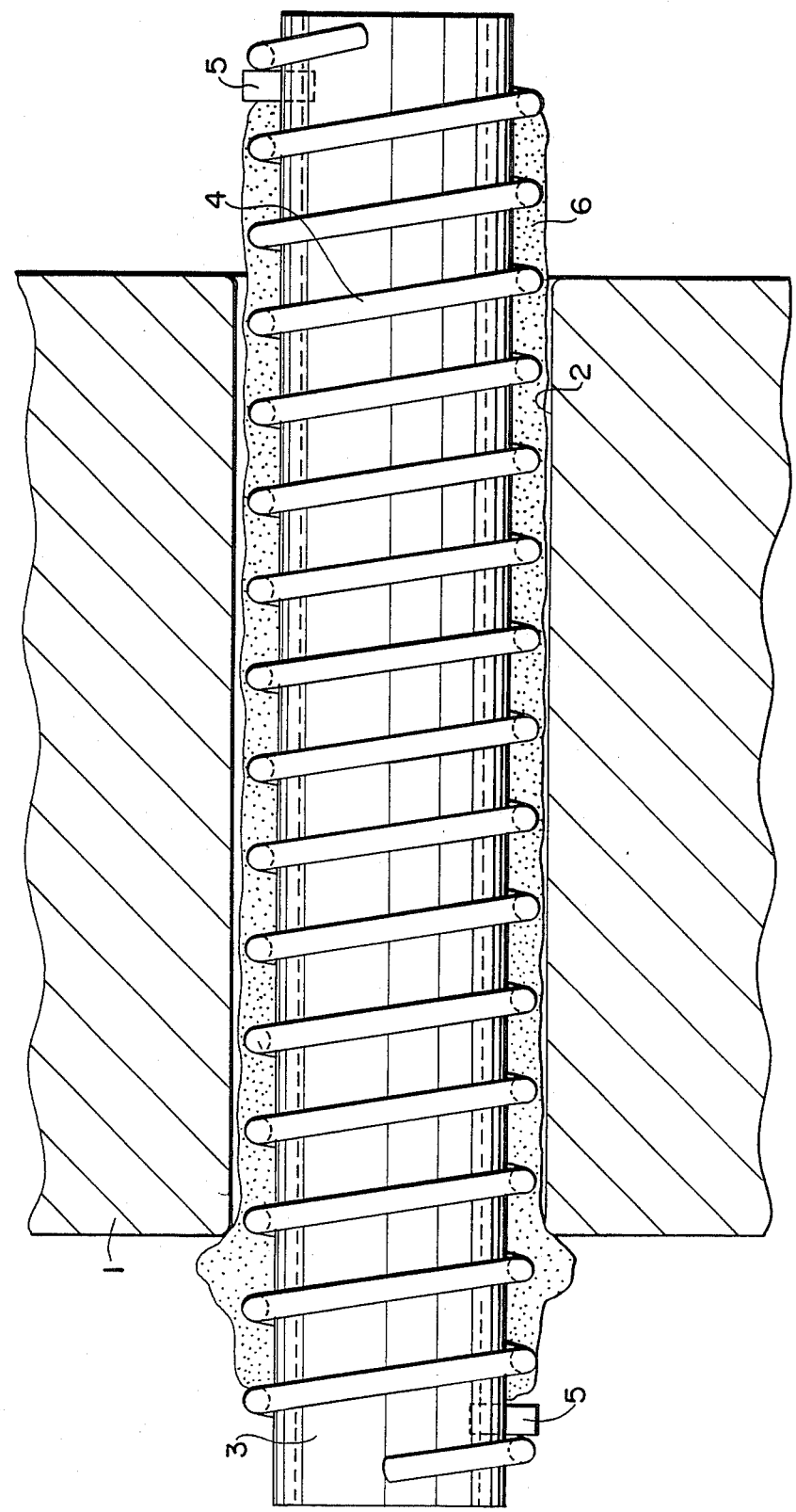
FIG. 1 is a house lead-in tube inserted into the opening of a lead-in wall bushing prior to injection of the lean mortar.

FIG. 1 is a sectional view of wall 1 with a house lead-in tube 3 inserted into the opening 2 of a leadin wall bushing and used, for example, for the house lead-in bushing of a gas or water supply line.

An auxiliary element 4 in the form of a garter spring which, in FIG. 1, is in the stretched state, i.e. its turns are pulled apart, is pushed onto the outer circumference of the lead-in tube 3. It is locked in this state on the tube 3 by pinned joints 5 on both ends of the spring. Lean mortar 3 is placed in the air gaps between the pulled-apart turns of the tension spring 4. This lean mortar is placed on the outer surface of the tube 3 prior to insertion of the tube 3 into the opening 2 of the lead-in wall bushing.

After the lead-in tube 3 with the stretched spring 5 disposed thereon and with the lean mortar 6 in the air gaps between the turns of the spring is inserted into the opening 2 of the lead-in wall bushing in the manner shown in FIG. 1, the pinned joints 5 are removed, so that the spring 4 can contract and its turns, which move closer to each other under the thrust of the spring, firmly grout the lean mortar located between the turns into the annular gap between the wall with the opening 2 of the lead-in wall bushing and the outer tube wall. Thus, the lean mortar 6 fills this annular gap tightly without leaving any spaces. The grouting of the mortar can be furthered by rotating the spring 4 on the tube 3 or by a light tap on the tube 3.

Figure 2:
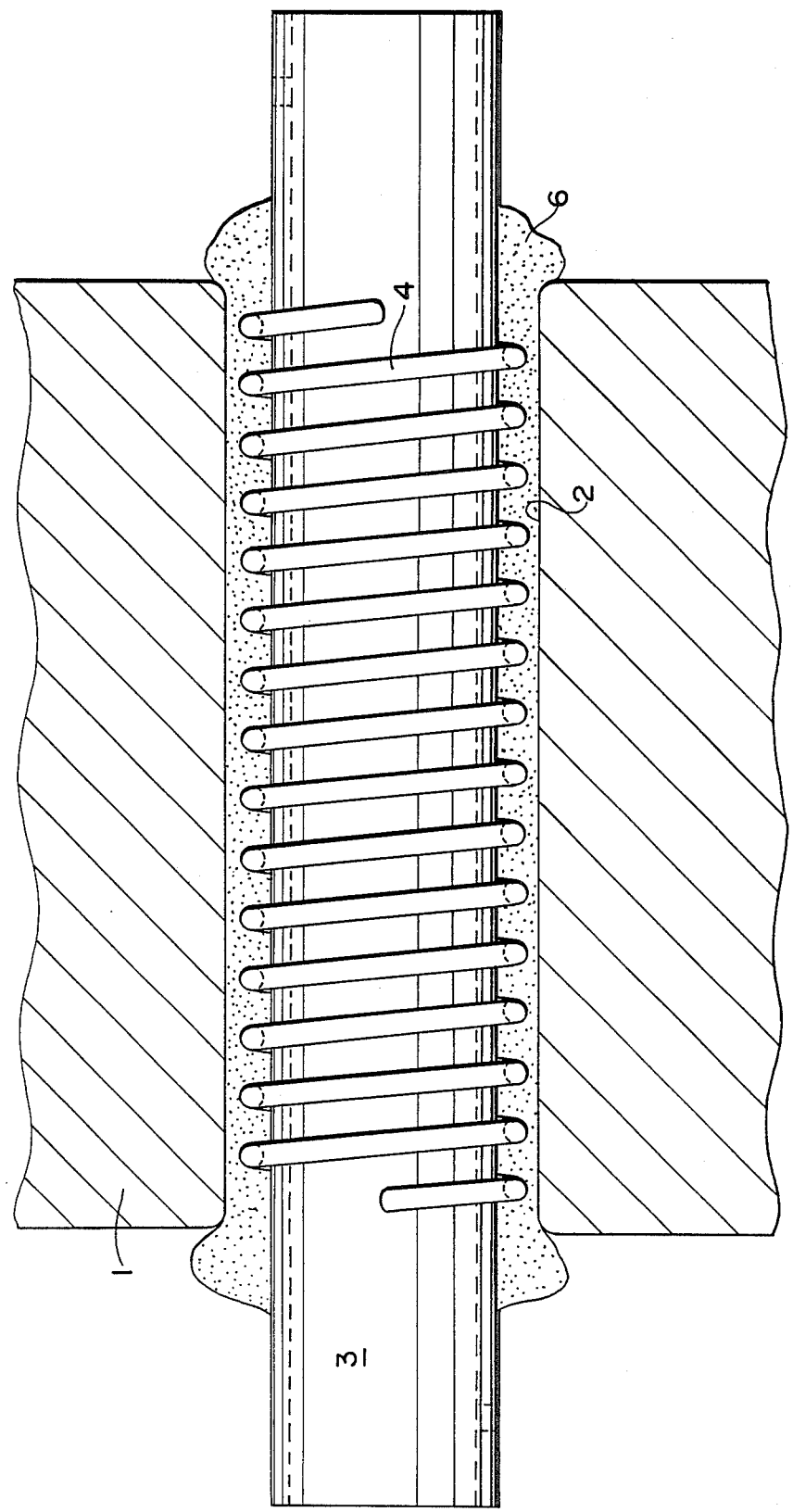
FIG. 2 shows the arrangement of FIG. 1 subsequent to injection of the lean mortar.

FIG. 2 shows the arrangement illustrated in FIG. 1 after the grouting of the lean mortar 6 by the contracting spring 4, which now lies completely inside the opening 3 of the lead-in wall bushing and augments the strength of the lean mortar 6.

Figure 3:
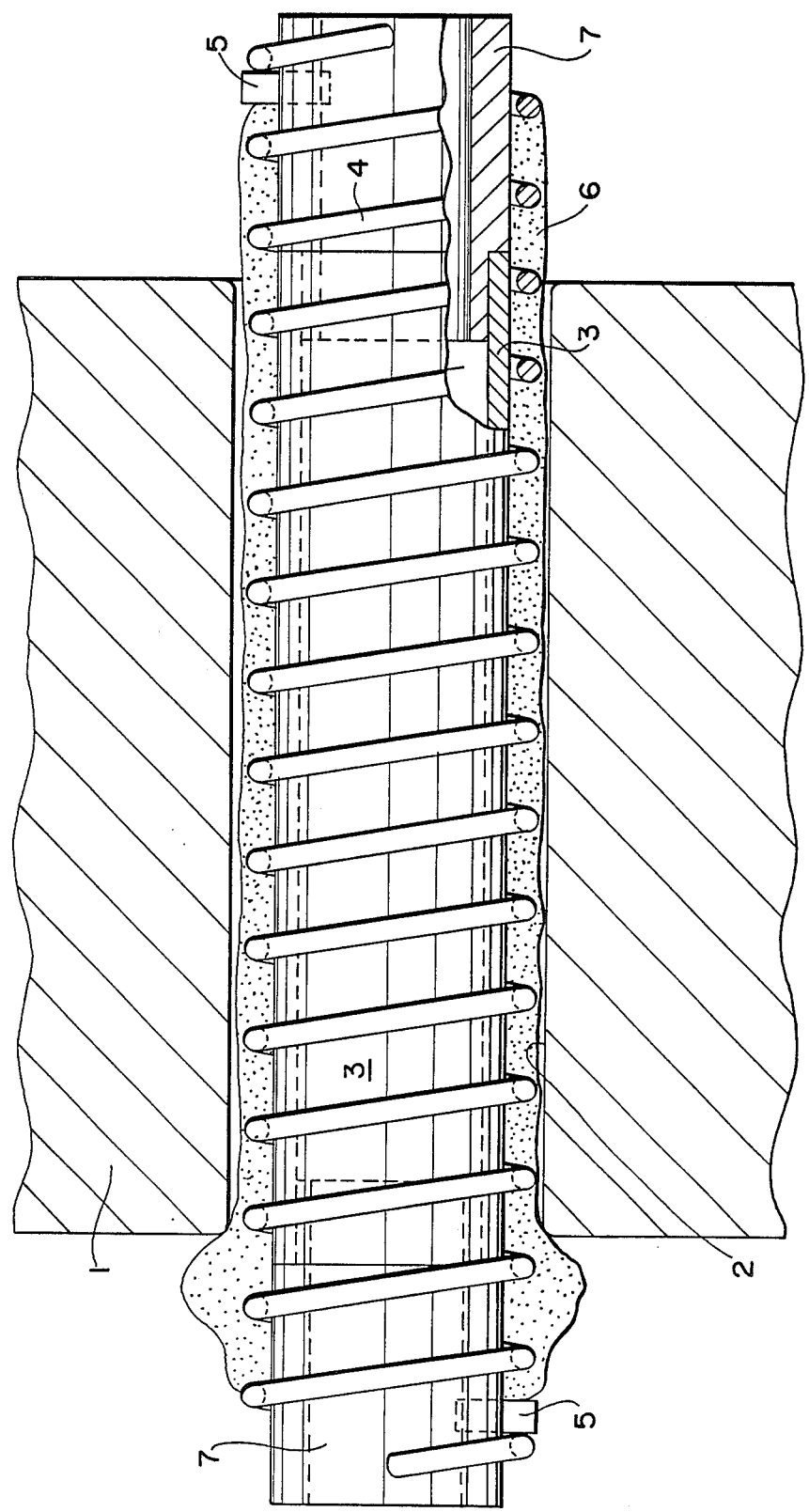
FIG. 3 is a modification of the arrangement depicted in FIG. 1.

In order to be able to locate the stretched spring 4 with the object of injecting the lean mortar into the air gaps between the turns, the tube 3 must have an appropriate length greater, of course, than the length of the opening 2 of the lead-in wall bushing. If the tube 3 does not, or only slightly, project over the opening 2 of the lead-in wall bushing, the arrangement depicted in FIG. 3 can be modified by assigning to either end of an appropriately short lead-in tube 3 an extension piece 7, which serves to locate and lock the ends of the stretched spring 4. After contraction of the spring 4 and grouting of the lean mortar 6, i.e., after attaining the state shown in FIG. 2, the extension pieces 7 can be removed from the ends of the tube 3 and used for other purposes.

I claim:

1. A feeding line house lead-in protective device for mounting in a masonry opening, the device comprising:
    a lead-in tube for insertion into a slightly larger masonry opening, the lead-in tube having an outer surface;
    an auxiliary element in the form of a helical tension spring extending around the outer surface of said tube, said spring having a stretched state and a retracted state; and
    means for axial fixation of the ends of said tension spring when the spring is in the stretched state.

2. The device as claimed in claim 1, wherein said means for the axial fixation of the ends of said tension spring comprise pinned joints provided on the outer surface of said tube.

3. The device as claimed in claim 1, wherein a loosely mounted extension piece associated with at least one tube end is provided for fixation of the respective spring end when the tension spring is in the stretched state.

4. A method for mounting a feeding line house lead-in protective device in a masonry opening, the device having a lead-in tube with an outer surface and an auxiliary element in the form of a helical tension spring having turns extending around the outer surface of the tube, said method comprising the steps of:

expanding said spring into a stretched state and injecting a filling compound between the turns of the spring and onto the outer surface of the tube;

maintaining said spring in said stretched state while inserting said protective device into said masonry opening; and releasing said spring from said stretched state to force said filling compound into an annular gap between said protective device and masonry opening.

5. The method of claim 4 wherein said spring is maintained in said stretched state by pinned joints on the outer surface of the tube, removal of said pinned joints releasing said spring.

6. The method of claim 4 further comprising the step of mounting an extension piece on the tube such that at least one end of the spring in the stretched state projects from the masonry opening.

* * * * *